Dec. 7, 1937.  R. OLSON ET AL  2,101,187
LEVEE DISK
Filed April 11, 1936   2 Sheets-Sheet 1
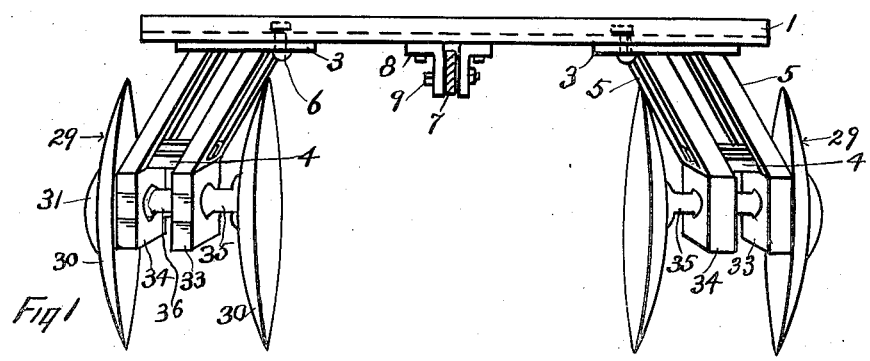
Fig 1
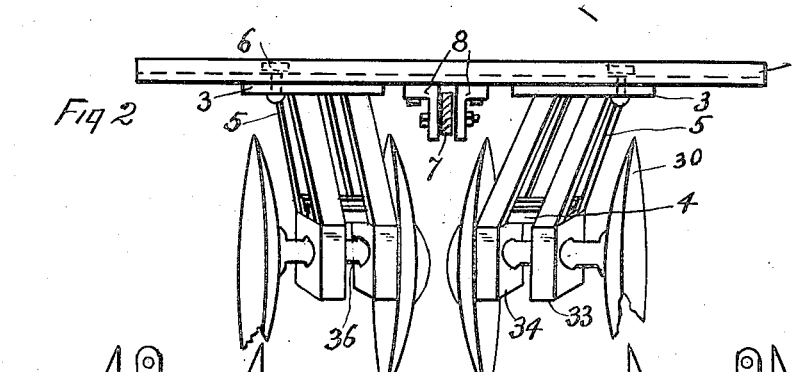
Fig 2
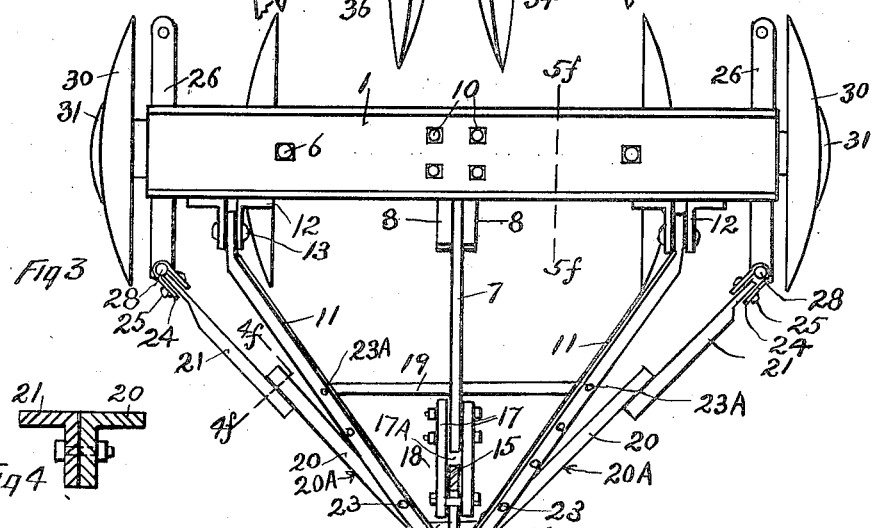
Fig 3
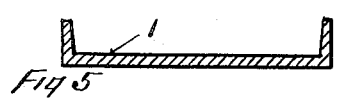
Fig 4
Fig 5
Joint Inventors
Ray Olson
Archie Olson
Francis C. Huebner,
Attorney

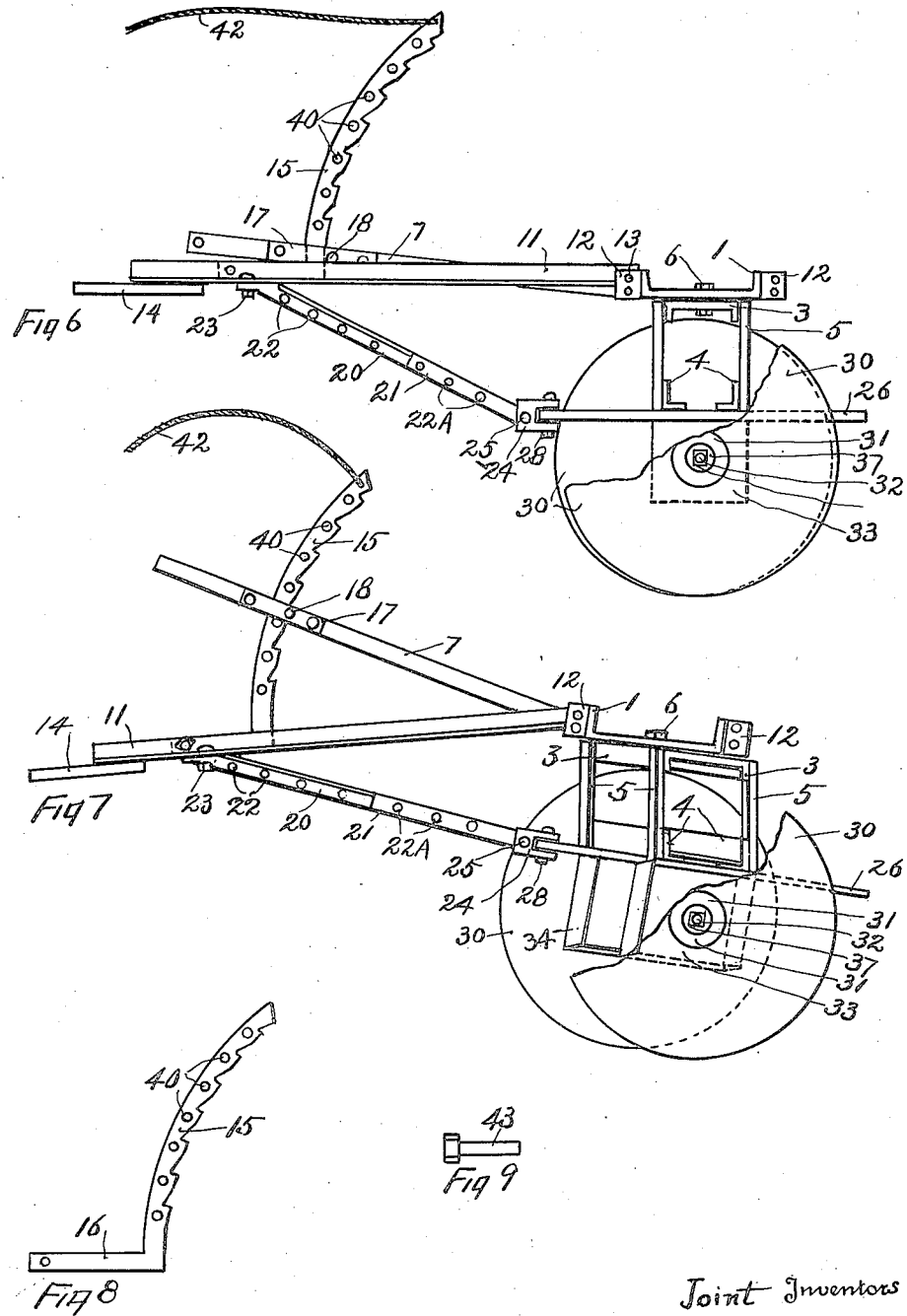

Patented Dec. 7, 1937

2,101,187

UNITED STATES PATENT OFFICE 2,101,187

LEVEE DISK

Ray Olson and Archie Olson, Kingsburg, Calif.

Application April 11, 1936, Serial No. 73,867

7 Claims. (Cl. 55—30)

In portions of our country where irrigation is used it is frequently necessary and desirable to construct levies, ridges, banks and ditches to direct the flow of water when irrigating. Such construction is so extensive that it is an important feature in a farmer's expense account when such banks and ditches are made with tools now in use. It is also necessary to level such banks and ditches after they have been in use for one or more irrigations.

One object of our invention is the construction of a disk plow, or earth working tool having a new and improved device for angling the disk blades with relation to the line of draft so ridges can be made, and by reversing the disk assembly the ridges can be leveled.

Another object is to provide an improved disk earth working tool in which the adjustments as to the cut of the disks can be made by the operator while driving the tractor.

Another object is improved means for shifting and reversing the gangs of the disks.

We accomplish these, and other objects hereinafter set forth by means of the device hereinafter described and illustrated on the accompanying drawings in which Fig. 1 is a rear view of our earth working tool showing an adjustment of the disk gangs for making a ridge or filling a ditch.

Fig. 2 is a rear view of the same device showing the faces of the disk blades reversed to adapt the tool to tear down a ridge or make a ditch.

Fig. 3 is a top view of our device.

Fig. 4 is an enlarged sectional view of an adjustable tie along sectional line 4f—4f, in Fig. 3.

Fig. 5 is an enlarged sectional view of the main base along sectional line 5f—5f in Fig. 3.

Fig. 6 is a side view of our device with the blades set to be inoperative.

Fig. 7 shows the device with the tongue raised to adjust the disk blades at a working angle.

Fig. 8 is a separate view of the rack.

Fig. 9 is an enlarged view of a pin.

Referring to the drawings, we have constructed a main base 1 which is preferably formed of channel iron to give the tool strength. Two auxiliary supports for the same number of disk assemblies or gangs are necessary for our device. Each of such auxiliary supports is constructed with a flat base 3, two members 5 attached to and depending from base 3, and bars 4 which connect, and tie the two depending members together at the lower end, as shown in Figs. 6 and 7. To ties 4 are attached bearings 33 and 34, which bearings carry the disk assembly in such relation that the disks can rotate.

Each disk assembly comprises preferably two disk blades 30, two bearing spools 35 which cooperate with bearings 33 and 34, a spacing spool 36, an axle 32 and washers 31. The disk blades, bearing spools, spacing spool and washers are all assembled concentric with each other on the axle 32 and are held in such assembled relation by nuts 37 on either end of the axle, thus clamping such assembly together as a unit.

The auxiliary disk supports are pivotally attached to the main base by a pivot bolt 6. The position of this pivot is near one end of the flat base 3, and positioned on the main base so that each disk assembly can be swiveled thereon so that the concave faces of the disks on the two gangs can face each other, or oppose each other, depending on the character of the work to be done as hereinafter explained. These two positions are shown in Figs. 1 and 2 of the drawings.

When the tool is adjusted so that the concave faces approximately face each other, and the disk blades are angled for cutting, the tool is used for making ridges, and when the opposite arrangement described is used, the tool is used for tearing down the ridges.

A tongue or lever 7 is attached rigidly to the base at approximately right angles thereto, and preferably midway between the ends, said lever extending to the vertical plane of the hitch as hereinafter more definitely described.

Draft members 11 comprise two bars which are pivotally attached at one end to base 1, on either side of tongue 7, the pivotal attachment being indicated as 13, said pivot permitting a vertical radial movement but not a horizontal movement. The free ends of the draft members are attached to a common hitch 14, which hitch is adapted to be attached to a tractor or other motive device.

Means for angling the disks with the line of draft consists of a tie, which we have formed preferably adjustable in length by forming it of two parts, 20 and 21, the two parts being bolted together in selective holes in the two parts, the holes being shown as 22 and 22A. One end of each tie is pivotally secured to the adjacent draft member 11, by pivot bolt 23 and the other end is pivotally attached to a bar 26, which bar is attached to the auxiliary support a spaced distance below the main base. It is here noted that the connection between bar 26 and tie 20A is preferably in the form of a double clevis 24 which permits of a universal radial movement, and the local of such connection with relation to pivotal connection 13 should be farther from the lateral center of the base if the tool is adjusted for making ridges, or closer to the lateral center of the base if the tool is adjusted for tearing down the ridges.

It is noted that when lever 7 is raised from an approximately parallel plane with the draft bars 11 to an angular relationship therewith, the main base or support 1 moves in an arc, and pivot 13 and clevis 24 likewise move in arcs having the same common center, but different radii. The result of the movement of the lever 7 upward results in comparatively shortening the tie formed of members 20 and 21 with the draft bar 11, which results in angling the disk blades with the line of draft.

To make practical use of this feature we have provided a rack, or ratchet bar 15, preferably having a curve so that when it is assembled with the lever 7 as hereinafter set forth, it will approximately follow the arc described by the movement of the lever 7, but it is noted that such curved form is not essential as a straight rack can be adapted for the same use. Ratchet bar 15 has an angular extension 16 at the bottom which extension is pivoted near its free end to draft bars 11. A plate 41 attached to the draft bars acts as a stop to limit the movement of the ratchet bar, and to normally hold it near engagement with the pawl or catch hereinafter described. The free end of lever 7 has a slot 17A therein, which slot may be formed by attaching extensions 17 on either side of the lever a spaced distance apart, the space being adapted to receive the ratchet bar 15 so it can move freely therein. A bolt 18 bridges such slot 17A and is positioned to engage the teeth on the ratchet bar. These teeth are sloping to permit bolt 18 to slide over the teeth when the lever is swinging upward, and to engage the teeth to hold the lever from moving downward.

Ratchet bar 15 is released from engagement with bolt 18 by swinging it on its pivot out of such engagement. This can preferably be accomplished by the operator of the tractor pulling on a cable 42 attached thereto. The object of extension 16 is to use gravity power to yieldingly hold the ratchet in engagement with catch or bolt 18.

To set the disk blades in our device at the angle to the line of draft desired, the tractor should be reversed and the ridging tool forced backwards. The convex faces of the disks will engage the earth, causing the disk blades to angle and the lever to rise. When the desired angle is secured, the tractor can move forward with the ridger and the ratchet bar will automatically engage the catch and hold the lever and the angled disk blades in such relation. When it is desired to lessen the angle of the disk blades with the line of draft, or to straighten the face of the disk with the line of draft, the ratchet can be disengaged with the catch, and the forward movement of the tool will effect the object sought.

It is noted that when the disk assemblies are set so that the concave faces of the disk blades of the two assemblies face each other as shown in Fig. 1, except that the disk blades should be angled to the line of draft for cutting, the tool will form a ridge or levee, and that when the disk assemblies are reversed so the convex faces of the two disk assemblies face each other, as shown in Fig. 2, the tool will tear down the ridge or form a ditch. When the ridger is reversed to level the ridge, clevis 24 should be attached to the opposite end of bar 26 than the end to which it is attached when adjusted for making the ridge. Holes 40 in ratchet bar 15 are adapted to insert a pin 43 therein to limit the upward movement of tongue 7.

We claim as new and ask for Letters Patent:

1. A ridging device comprising two gangs of disks, each gang being pivotally attached to a common base, said disk being positioned so the concave faces of the disks of one gang face in the opposite direction of the concave faces of the other gang, draft means consisting of two draft bars pivotally attached to the common base a spaced distance from the lateral center of said base, the free ends of the draft bars meeting at and attached to a hitch, and means for angling the disk blades with the line of draft consisting of a tie for each gang, each of said ties being pivotally attached at one end to the support for the disk gang a spaced distance below the common base, and a spaced distance to the right or to the left of the local of the connection attaching the draft bar to the common base, the other end being pivotally attached to the draft bar, a lever attached at one end to the common base and at approximately right angles thereto, said lever extending toward the hitch, and being adapted to be raised or lowered with relation to the hitch, and means for holding the lever in selective raised positions.

2. A device described in claim 1 in which the ties connecting the disk gangs and the draft bars are adjustable as to length.

3. A ridging device comprising two separate gangs of disks, each gang being pivotally attached to a common base, the disk blades on one gang having their concave faces facing the concavity of the faces of the disks of the other gang, draft means consisting of a draft bar for each gang of disks connected at one end to a common hitch and at the other end pivotally attached to the common base a spaced distance from the lateral center of the base, tie bars pivotally attached at one end to the draft bar adjacent thereto, the other end being pivotally attached to the adjacent gang of disks, the local of such attachment being below the level of the base, and on a line farther removed from the center of the common base than the local of the draft bar attachment, a lever attached to the common base at approximately right angles thereto, said lever being adapted to be moved in angular relation with the plane of the draft bars, and means for holding the lever and draft bars in selective angular relations.

4. A device of the character described in claim 3 having means for holding the lever and draft bars in selective angular relation comprising a slotted member at the end of the lever, said slotted member having a catch therein, and a ratchet member adapted to engage said catch, the ratchet member being pivotally connected to the draft members, and adapted to normally swing into relation engaging said catch, and hand means for disengaging said ratchet member with said catch.

5. A ridging device comprising two separate gangs of disks each gang being pivotally attached to a common base a spaced distance apart, each of said gangs being pivoted near the ends of said gangs facing the concave faces of the disks blades, draft means consisting of draft bars connected at one end to a common hitch and pivotally attached at the other ends to the common base spaced distances from the approximate lateral center of the common base, tie bars pivotally attached at one end to the draft bar adjacent to said tie bar and near the hitch end of the draft bar, the other ends of the tie bar being pivotally connected with the adjacent gang of disks on a level below the common base and on a vertical line farther removed from the center of the common base than the connection of the draft bar with said common base, a lever attached to said common base at approximately right angles thereto, said lever being adapted to move the assembled elements forming the ridging device so that the lever can be on a parallel plane with the plane of the draft bars, or at an angle thereto, and means for holding said lever in selective angular relation with the plane of the draft bars.

6. In a device described in claim 5, said gangs being spaced apart far enough to permit the gangs to be turned in any direction on the pivoting means connecting said gangs with the common base, without the disks gangs touching each other.

7. In a disk earth working tool comprising two gangs, each gang being pivotally attached to a common base a spaced distance apart, means for angling the disk blades with the line of draft consisting of draft bars pivotally attached to a common base a spaced distance apart, the other ends of the draft bars forming a common hitch, a tie bar pivotally attached at one end to each of the draft bars near the hitch end, the other ends being pivotally connected with a bar rigidly attached to the gang adjacent to the draft bar to which the tie bar is attached, a lever attached to the common base at approximately right angles thereto and extending toward said hitch, said lever being adapted when raised or lowered to change the relationship of the draft bars and the attached tie bar, and to change the angle of the disk blades with relation to the line of draft, and means for holding the lever in selective raised positions.

RAY OLSON.
ARCHIE OLSON.